United States Patent [19]
Gebhardt

[11] Patent Number: 5,769,480
[45] Date of Patent: Jun. 23, 1998

[54] POWER SEAT APPARATUS

[76] Inventor: Robert J. Gebhardt, P.O. Box 282, Waltham, Minn. 55982

[21] Appl. No.: 722,662
[22] Filed: Sep. 30, 1996
[51] Int. Cl.[6] .................................................. B60N 2/02
[52] U.S. Cl. ...................... 296/65.1; 414/522; 297/344.2
[58] Field of Search ................................ 296/65.1, 68.1; 297/344.2, 344.3, 344.11

[56] References Cited

U.S. PATENT DOCUMENTS

| 3,236,556 | 2/1966 | Lather | 296/65 |
| 4,155,587 | 5/1979 | Mitchell | 296/65 |
| 4,278,387 | 7/1981 | Sequela et al. | 414/462 |
| 4,457,663 | 7/1984 | Hems et al. | 414/522 |
| 4,479,752 | 10/1984 | Todd | 414/462 |
| 4,733,903 | 3/1988 | Bailey | 296/65 R |
| 5,373,915 | 12/1994 | Tremblay | 187/201 |
| 5,466,111 | 11/1995 | Meyer | 414/462 |
| 5,524,952 | 6/1996 | Czech et al. | 296/65.1 |
| 5,630,638 | 5/1997 | Hirasawa | 296/65.1 |

Primary Examiner—Jesus D. Sotelo
Attorney, Agent, or Firm—Nawrocki, Rooney & Sivertson, P.A.

[57] ABSTRACT

Apparatus for use in moving a seat in a vehicle while maintaining vehicle seating capacity. The apparatus includes a frame coupled to the vehicle. A mechanism is provided which is coupled to the seat and frame for moving the seat between a forward facing position within the vehicle and an outward facing position outside of the vehicle. The mechanism has a single power mechanism for moving the seat in a first outward/inward direction and a second raised/lower direction. The single power mechanism may further rotate the seat in a third direction.

21 Claims, 7 Drawing Sheets

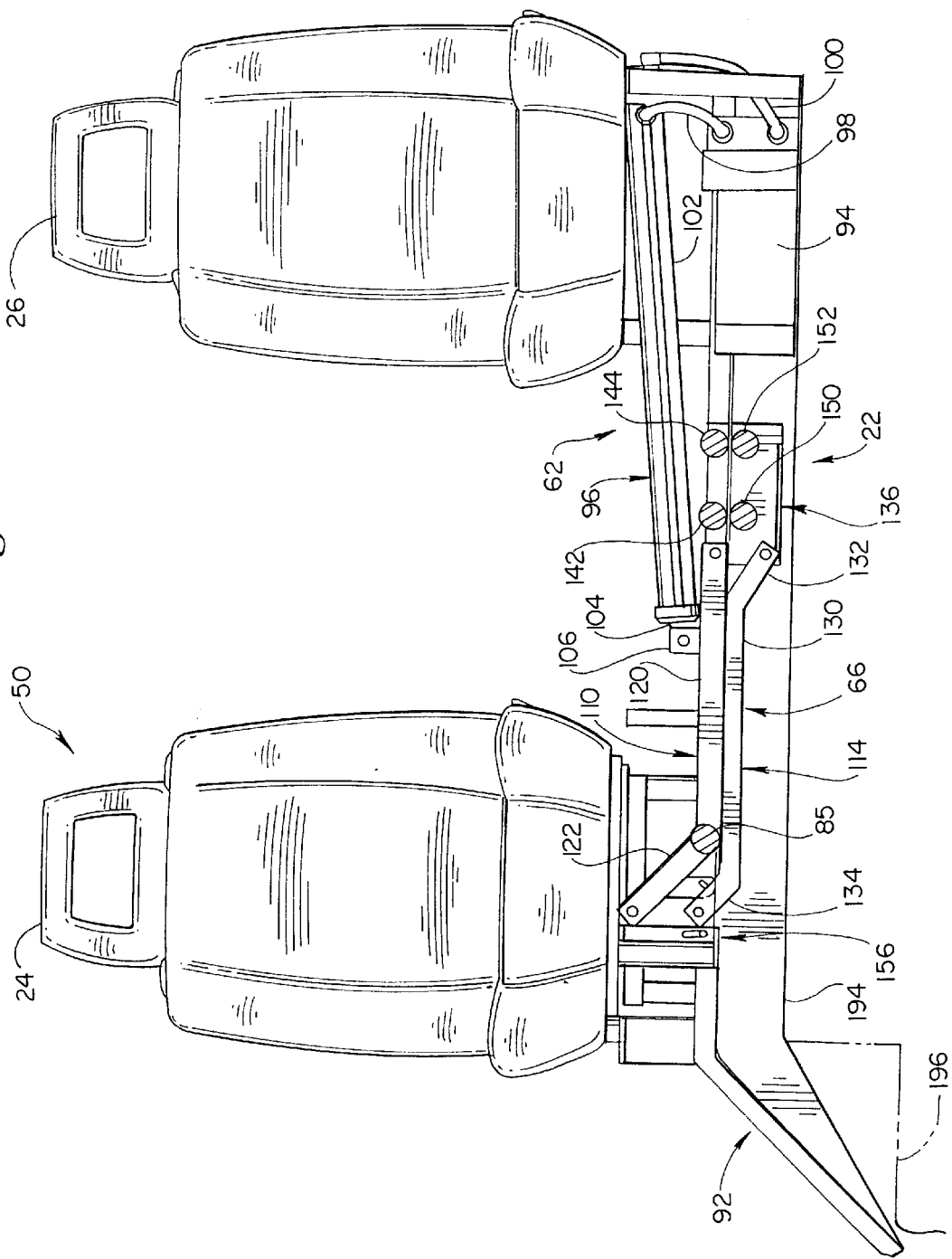
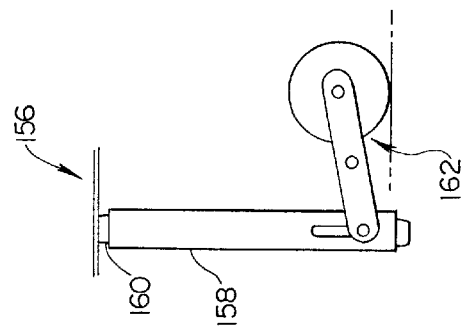

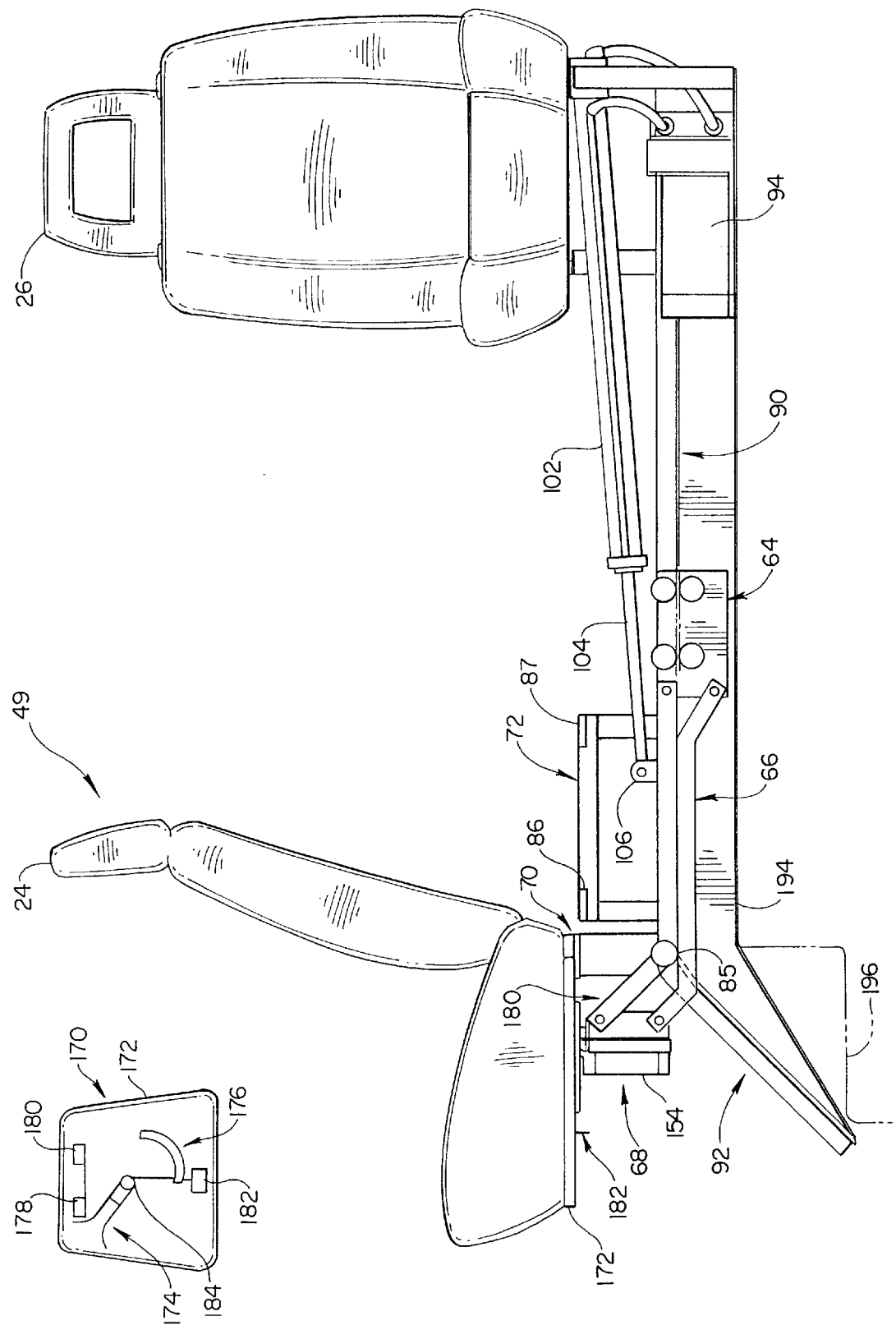

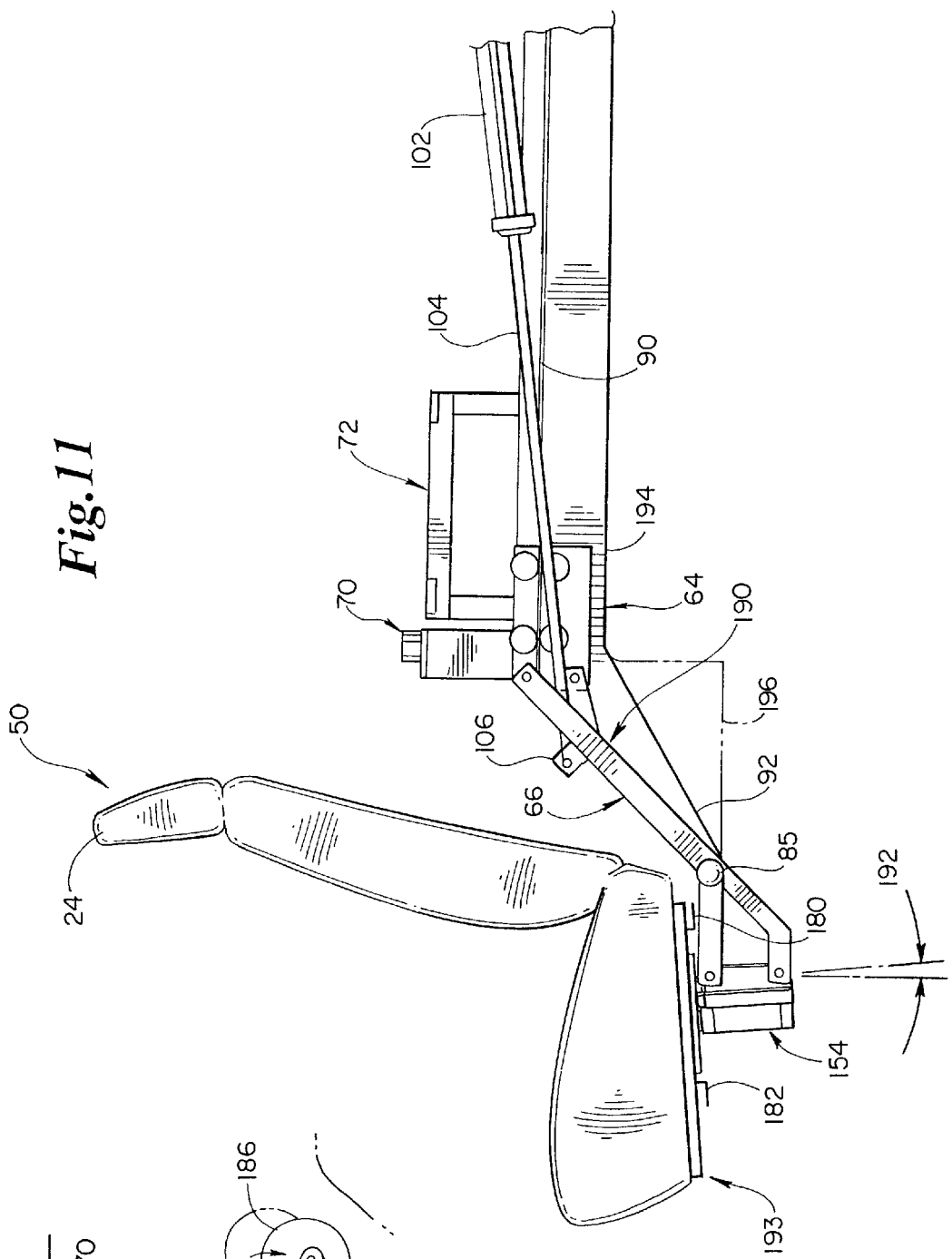

5,769,480

POWER SEAT APPARATUS

FIELD OF THE INVENTION

The present invention relates generally to systems for aiding an individual in entering and exiting a vehicle. In particular, the present invention relates to a power seat apparatus designed to aid an individual in getting in and out of a vehicle, wherein the power seat apparatus moves the seat between a first forward facing riding position within the vehicle to a second lowered, outward facing position outside of the vehicle, while maintaining vehicle seating capacity.

A number of vehicle systems have been developed to enable handicapped or disabled individuals to enter/exit a vehicle or to operate a vehicle. These devices range from simple moveable seats to wheelchair lifts and ramps. Examples of such devices are shown in the following known references: U.S. Pat. No. 5,524,952 to Czech et al. (Semi-ambulatory Companion Seating System and Method); U.S. Pat. No. 5,466,111 to Meyer (Wheelchair and Lifting Apparatus for Handicapped Persons Driving Automobiles); U.S. Pat. No. 5,373,915 to Tremblay (Passenger Lift with an Electric Safety Interlock); U.S. Pat. No. 4,733,903 to Bailey (Swivellable Seat for Motor Vehicles); U.S. Pat. No. 4,479,752 to Todd (Motor Vehicle Adapted for Disabled Driver); U.S. Pat. No. 4,457,663 to Hems et al. (Vehicle Entry System for Invalids and a Wheel Chair Suitable for Use with the Entry System); U.S. Pat. No. 4,278,387 to Seguela et al. (Device for Transferring an Invalid from his Invalid Chair into a Motor Vehicle and Conversely); and U.S. Pat. No. 3,236,556 to Lathers (Moveable Seat for Motor Vehicle).

U.S. Pat. No. 4,155,587 to Mitchell suggests a moveable automobile seat. The moveable automobile seat generally includes a seat frame mounted on a generally trolley-like system having a curved trolley track for moving the seat between a first driving position and a second position, wherein the seat lies outside the vehicle. Multiple hydraulic cylinders raise and lower the seat when the seat is in the second position located outside the vehicle.

It is desirable to have a power seat apparatus which allows a vehicle seat to be moved between a first position within the vehicle and a second position outside the vehicle, while maintaining vehicle seating capacity. Further, it is desirable to have a power seat apparatus which is moveable in multiple directions while being powered from a single power mechanism. It is also desirable to have a power seat apparatus which includes safety switches for operation of the power seat and an interlock system for selectively locking the seat in a forward facing riding position and an outward facing exiting position outside of the vehicle.

SUMMARY OF THE INVENTION

The present invention relates to a power seat apparatus designed to aid an individual in getting in and out of a vehicle. The power seat apparatus, in accordance with the present invention, allows a vehicle seat to be moved between a first position within the vehicle and a second position outside of the vehicle, while maintaining vehicle seating capacity.

The power seat apparatus, in accordance with the present invention, is operated to move a seat in multiple directions while being powered from a single power mechanism. Specifically, the seat is moved in a horizontal direction, rotated and raised/lowered. Further, the power seat apparatus may include safety switches for operation of the power seat and an interlock system for selectively locking the seat in a forward facing riding position and an outward facing exiting position outside of the vehicle.

In one embodiment, the present invention includes an apparatus for use in moving a seat in a vehicle, while maintaining vehicle seating capacity. The apparatus includes a frame coupled to the vehicle. Means are provided which are coupled to the seat and frame for moving the seat between a forward facing position within the vehicle and an outward facing position outside of the vehicle, having a single power mechanism for moving the seat in a first outward/inward direction and a second raised/lowered direction. The single power mechanism may further rotate the seat in a third direction.

In one embodiment, the single power mechanism is a hydraulic pump coupled to a single hydraulic cylinder. The means for moving the seat include the single power mechanism coupled to a trolley system. The power mechanism may be coupled to the trolley system through a parallel linkage system.

The means for moving the seat may further include a cam follower system. The cam follower system may include a cam follower coupled to the frame, and a cam follower bracket coupled to the seat.

In yet another embodiment, the present invention includes an apparatus for moving a seat for a vehicle. The apparatus includes means for moving the seat between a first riding position and a second position outside of the vehicle. Means are provided for timed rotation of the seat relative to the apparatus frame as the seat moves between the first riding position and the second position outside of the vehicle. Means are also provided for lowering/raising the seat as it is moved between the first riding position and the second position outside of the vehicle.

Further, means may be provided for locking the seat within a first riding position, and means may be provided for locking the seat in a position outside of the vehicle.

The means for moving the seat may include a trolley system coupled to a single hydraulic cylinder. The means for timed rotation of the seat may include a cam follower system. The means for lowering/raising the seat may include a parallel linkage system coupled between the seat and the trolley system, and the apparatus frame having a trolley track. The frame may include a first portion located generally parallel to the vehicle floor and a second portion exiting from the first portion which is angled downward as it exits the vehicle.

When the seat is moved to a position outside of the vehicle, the seat may be moved within inches of the ground. Further, the seat may be tipped downward when it is in the second position outside of the vehicle.

BRIEF DESCRIPTION OF THE DRAWINGS

The invention will be further described with reference to the accompanying drawings where like reference numerals indicate corresponding parts or elements of the present invention throughout the several views, and wherein:

FIG. 6 is a side elevational view of the power seat apparatus in accordance with the present invention of FIG. 1 shown in a first riding position;

FIG. 7 is an enlarged detail of the latch mechanism shown in FIG. 6;

FIG. 8 is a top view of the seat plate of the power seat apparatus in accordance with the present invention;

FIG. 9 is a side elevational view of the power seat apparatus in accordance with the present invention of FIG. 1 shown in an intermediate position;

FIG. 10 is another enlarged detail of the latch mechanism shown in FIG. 8 in a latched position;

FIG. 11 is a side elevational view of the power seat apparatus in accordance with the present invention of FIG. 1 shown in an outward facing extended position outside of the vehicle;

DETAILED DESCRIPTION OF THE PREFERRED EMBODIMENTS

The present invention is a power seat apparatus which allows a vehicle seat to be moved between a first position within the vehicle and a second position outside of the vehicle, while maintaining vehicle seating capacity. The power seat apparatus is moveable in multiple directions while being powered from a single power mechanism which is compactly located below the seat. The power seat apparatus also includes safety switches for operation of the power seat and an interlock system for selectively locking the seat in a forward facing riding position and an outward facing exiting position outside of the vehicle.

Figure 1:
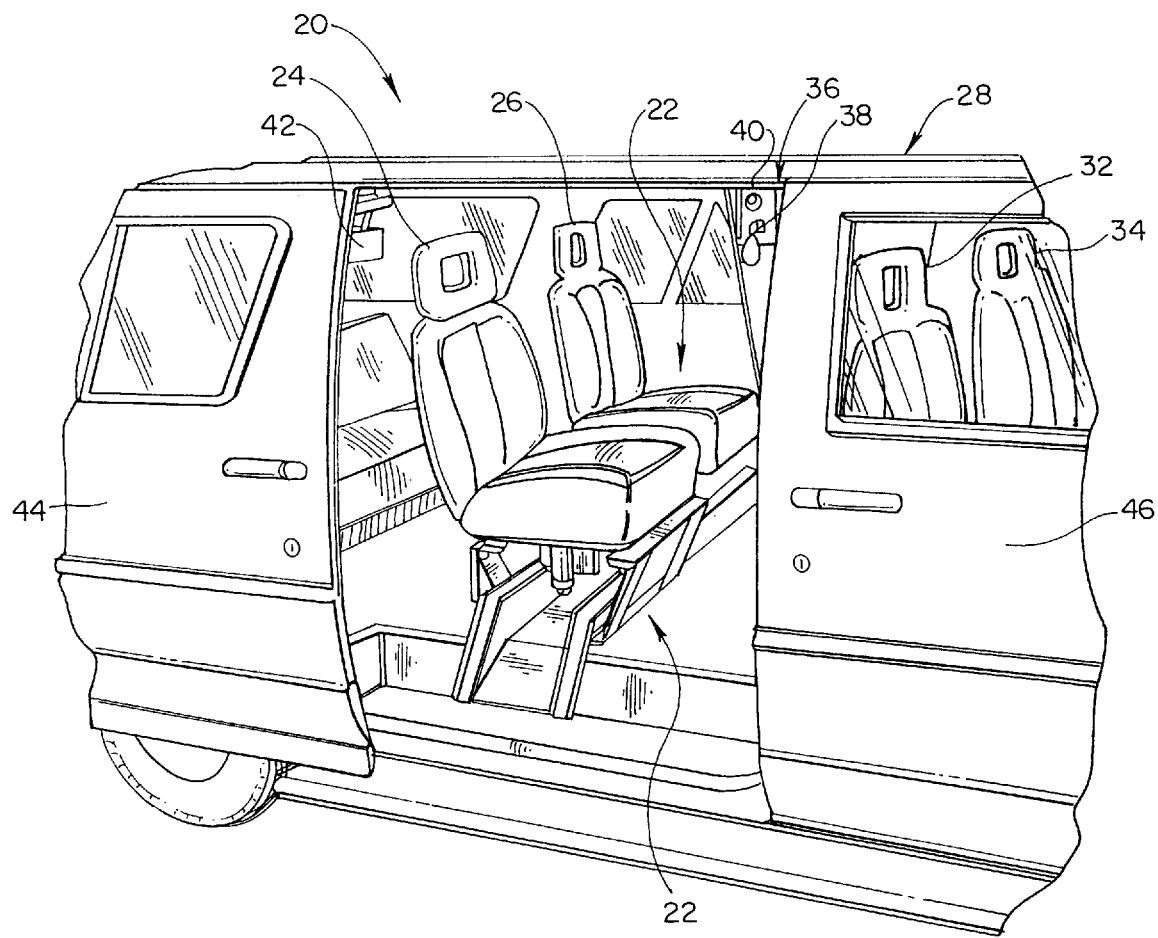
FIG. 1 is a partial side perspective view of the power seat apparatus of the present invention located within a vehicle.

FIG. 1 shows a vehicle seating system in accordance with the present invention generally at 20. The vehicle seating system 20 allows a vehicle seat to be moved between a first, riding position within a vehicle to a second position outside of the vehicle to aid an individual in getting in and out of the vehicle.

The vehicle seating system 20 generally includes power seat apparatus 22 having a first moveable seat 24 and a second stationary seat 26 located thereon within vehicle 28. Although in the embodiment shown, the power seat apparatus 22 is adapted for use with a passenger seat in a mini-van, it is recognized that the power seat apparatus 22 may be used with other types of vehicles, such as a car, truck, or full size van. Further, the power seat apparatus 22 may be adapted for use with the vehicle back seats (shown) or other seats, such as the passenger front seat 32, or the driver seat 34.

A control mechanism 36 is provided for operating the power seat apparatus 22. The control mechanism 36 may include a keyed switch 38 and a push button operator 40. The power seat apparatus 22 may further include safety interlock mechanism 42, which allows operation of the power seat apparatus 22 only when the vehicle door 44 is engaged in a full open position. In the embodiment shown, the control mechanism 36 is mounted adjacent the front door 46. It is recognized that the control mechanism 36 may be located anywhere within the vehicle 28, or alteratively, may include a remote control unit for remote control of the power seat apparatus 22.

Figure 2:
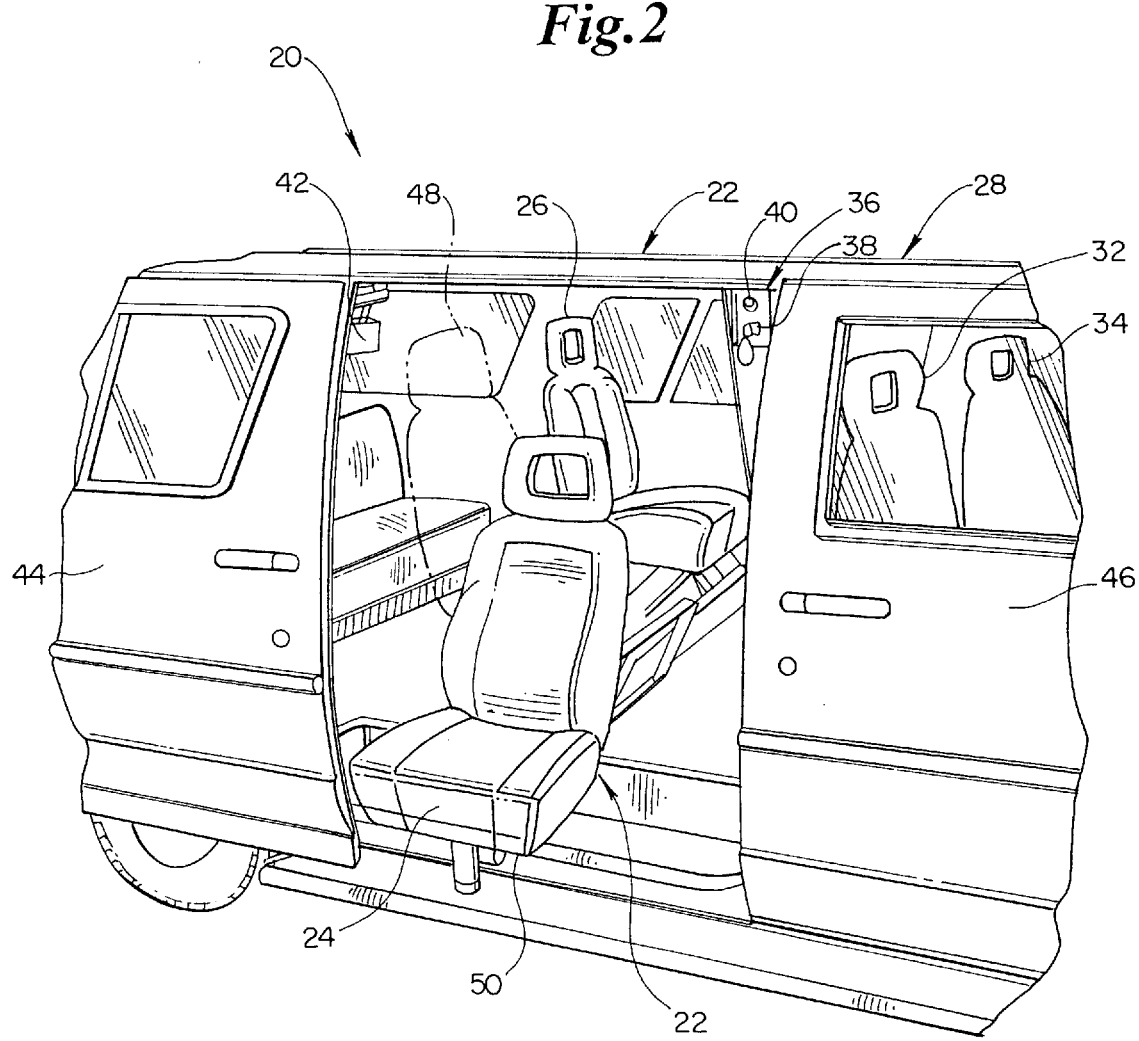
FIG. 2 is another partial side perspective view of the power seat apparatus in accordance with the present invention, wherein the vehicle seat is in the process of being moved to a position outside of the vehicle.

Referring to FIG. 2, by operating control mechanism 36, moveable seat 24 may be moved between a riding position 48 (shown outlined) and an extended position 50, wherein the seat is located at least partially outside of vehicle 28. In one embodiment, when vehicle side door 44 is in a full open position, safety interlock 42 allows operation of control mechanism 36. By operation of key switch 38 in a forward or reverse position, the power seat apparatus 22 may be operated to move the moveable seat 24 by pushing toggle operator 40. Moveable seat 24 is lockable in either a riding position 48 or an extended position 50. In the riding position 48, the moveable seat 24 is locked in a position facing forward in vehicle 28, and in an extended position 50, the moveable seat 24 is locked in a position facing outward from vehicle 28.

The vehicle seating system 20, in accordance with the present invention, allows moveable seat 24 to be moved from a position located within the vehicle 28 to a position outside of vehicle 28, while allowing seating capacity to be maintained within the vehicle 28. The power seat apparatus 22 is a single compact unit located below the moveable seat 24 and the stationary seat 26, allowing for conventional use of the rest of vehicle 28.

Figure 3:
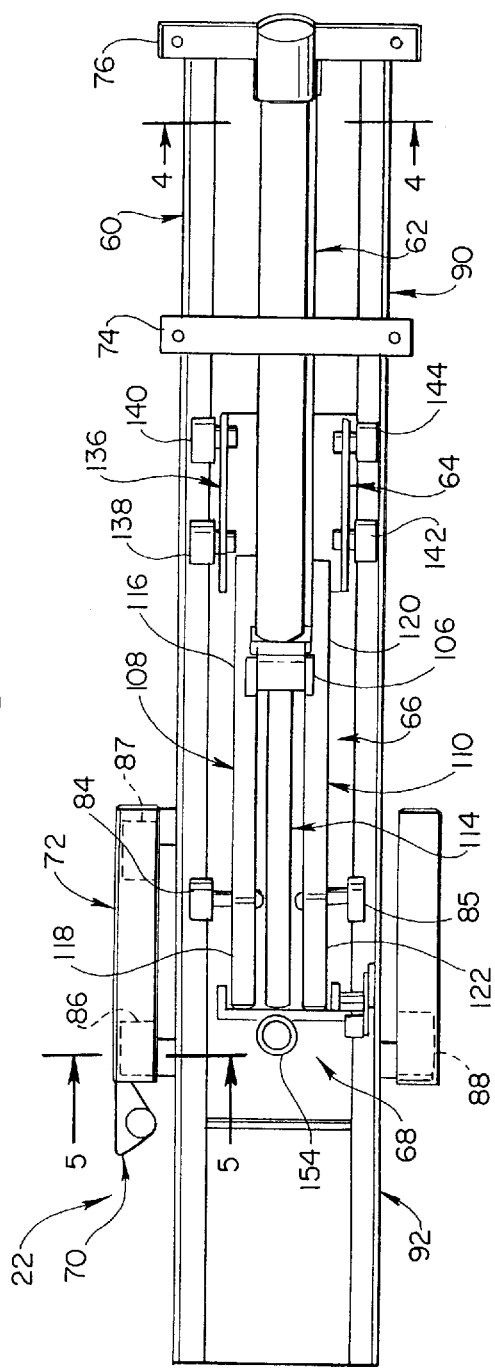
FIG. 3 is a top view of the power seat apparatus in accordance with the present invention shown in FIG. 1.

Referring to FIG. 3, a top view of the power seat apparatus 22 in accordance with the present invention is generally shown having moveable seat 24 and stationary seat 26 removed. The power seat apparatus 22 generally includes frame 60, power mechanism 62, trolley system 64, parallel linkage system 66, seat pivot bracket 68, and cam follower system 70. Each of these systems will be specifically described in detail within the specification in the following paragraphs.

The frame 60 is mounted to the floor of vehicle 28. Stationary seat 26 is mounted to frame 60 at mounting bracket 74 and mounting bracket 76. Moveable seat 24 is rotatably coupled to frame 60 at seat mounting bracket 68, and may be locked to the frame 60 using seat locking mechanism 72.

In one preferred embodiment, the frame is formed of metal. It is also recognized that frame 60 may be formed of other rigid or hard materials, such as rigid polymers or plastics.

Figure 4:
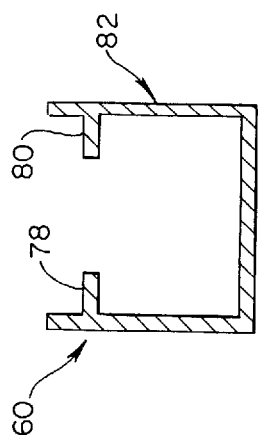
FIG. 4 is a cross-sectional view of the power seat apparatus frame taken along line 4—4 of FIG. 3.

Referring to FIG. 4, the frame is generally unshaped, trough-shaped, or tunnel-shaped. The frame 60 includes a trolley rail 78 and a trolley rail 80. Further, the frame 60 generally includes a lower portion 82 for compact containment of the power mechanism 62. In one preferred embodiment, the power mechanism 62 is a hydraulic power mechanism system. Due to the uniquely shaped design of the frame 60, if a hydraulic fluid leak should occur, the hydraulic fluid is safely contained within lower portion 82 for cleanup.

In one preferred embodiment, the hydraulic power mechanism 62 is located within the frame lower portion 82. The trolley system 64 runs on the frame 60. The parallel linkage system 66 is coupled at one end to the trolley system 64 and the hydraulic power mechanism 62. At an opposite end, the seat mounting bracket 68 is coupled to the parallel linkage system 66. The parallel linkage system 66 is supported by a set of rollers 84, 85. Seat locking mechanism 72 extends from the frame 60.

Figure 5:
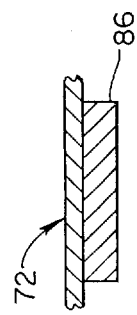
FIG. 5 is a cross-sectional view taken along line 5—5 of FIG. 3.

Referring to FIG. 5, the seat locking mechanism 72 generally includes locking pads 86 for locking the moveable seat 24 in a forward riding position. Further coupled to the frame 60, at a position adjacent the seat locking mechanism 72, is the cam follower system 70.

Referring to FIG. 6, a side elevational view of the power seat apparatus 22 is shown in a riding position 48, having moveable seat 24 and stationary seat 26 mounted thereon. Located generally below the stationary seat 26 is hydraulic power mechanism 62.

The frame 60 generally includes first track portion 90 and a second track portion 92. The first track portion 90 is generally horizontal to the vehicle floor, and the second track portion 92 extends downward at an angle from the first track portion 90 for allowing the seat 24 to exit the vehicle 28.

It is recognized that the first track portion 90 and second track portion 92 may be separate track portions. For example, in an alternative embodiment, first track portion 90 extends to a location proximate the cam follower system 70 for movement of trolley system 64 thereon. The second track portion 92 may include a parallel portion located above first track portion 90 on top of frame 60 for movement of the rollers 84 and 85 thereon. The second track portion 92 would then extend from the generally parallel portion to a downward extending portion at an angle from the parallel portion for exiting the vehicle. In this embodiment, it is contemplated that the trolley system 64 would only run on the first track portion 90, and the rollers 84 and 85 would only run on the second track portion 92. It is recognized that adjustments may be necessary to adapt individual track systems to specific vehicles.

The hydraulic power mechanism 62 generally includes hydraulic pump 94 and hydraulic cylinder 96. Hydraulic pump 94 is very compact, being located below the hydraulic cylinder 96 within the frame lower portion 82. The hydraulic pump 94 is in fluid communication with the hydraulic cylinder 96 through hydraulic hose 98 and hydraulic hose 100. Hydraulic pump 94 is securely mounted to frame 60. The hydraulic cylinder further includes cylinder housing 102 and cylinder rod 104. The cylinder housing 102 is coupled at one end to the frame mounting bracket 76. At an opposite end, the cylinder rod 104 is rotatably coupled to the parallel linkage system 66 at bracket 106.

The parallel linkage system 66 generally includes upper arms 108, 110 and a lower arm 114. Upper arm 108 generally includes a straight portion 116 and an upward extending portion 120. Upper arm 110 generally includes a straight portion 118 and an upward extending portion 122. Lower arm 114 includes a straight portion 130, a downward extending portion 132, and an upward extending portion 134.

The upper arms 108, 110 and the lower arm 114 are rotatably coupled between seat mounting bracket 68 and trolley system 64. Specifically, upper arm 108 is rotatably coupled between the seat mounting bracket 68 and the trolley system frame 136. Upper arm 110 is rotatably coupled between the seat mounting bracket 68 and the trolley system 136. Upper arm 108 is rotatably coupled between the seat mounting bracket 68 and the trolley system frame 136. Lower arm 114 is rotatably coupled between the seat mounting bracket 68 and the lower arm 114. In one embodiment, between where the upper arms 108, 110 and the lower arm 114 are rotatably coupled to seat mounting bracket 68 is greater than the distance between where the upper arms 108, 110 and the lower arm 114 are rotatably coupled to the trolley system 136. As the power seat apparatus 22 is operated to extend seat 24 from the vehicle 28, this difference in mounting distances results in drawing the lower arm 114 farther under and toward the vehicle 28. As a result, seat 24 is slightly tipped forward to aid an individual in transferring onto the seat 24.

Further, parallel linkage system 66 is supported at upper arm 108 where the straight portion 116 meets the upward extending portion 118 by roller 84, and at upper arm 110 where the straight portion 120 meets the upward extending portion 122 by roller 85. It is recognized that roller 84 and roller 85 may be located at any given point along the upper arm's straight portion 116 and straight portion 120 between the seat mounting bracket 68 and the trolley system 65, depending on the travel requirements for adapting the power seat apparatus 22 to individual vehicles.

The trolley system 64 is movably coupled to the frame 60. In particular, the trolley system frame 136 is movably coupled to the power seat apparatus frame 60 through upper trolley wheels 138, 140, 142 and 144, and lower trolley wheels 146, 148, 150 and 152. The upper trolley wheels 138–144 ride on top of the corresponding trolley rail 78 and trolley rail 80, and the lower trolley wheels 146–152 ride below the corresponding trolley rail 78 and trolley rail 80.

Seat mounting bracket 68 is located at and coupled to the end of parallel linkage system 66. The seat mounting bracket 68 generally includes a seat pivot member 154 and latch mechanism 156.

Referring to FIG. 7, latch mechanism 156 generally includes housing 158 having pin 160 and follower 162. As follower 162 is operated downward, pin 160 extends upward from housing 158. The latch mechanism 156 operates to engage the moveable seat 24 in a locked position as it moves from cam follower system 70.

The cam follower system 70 is secured to frame 60. The cam follower system 70 is located adjacent the seat locking mechanism 72. The cam follower system 70 operates to rotate the moveable seat 24 in a timed pattern for moving the moveable seat 24 between a forward riding position 48 and an outward facing extended position 50.

Referring to FIG. 8, a top view of seat plate 170 is shown. Seat plate 170 is securely mounted to the bottom of moveable seat 24. Seat plate 170 is generally formed of metal. Seat plate 170 generally includes plate body 172, cam follower bracket 174, locking mechanism track 176, and locking mechanisms 178, 180 and 182. Extending from the plate body 172 at the end of cam follower bracket 174 is seat shaft 184. Seat shaft 184 is sized to pivotally fit within the seat pivot member 154, and is located off center of plate body 172. Cam follower bracket 174 extends outward from plate body 172 for operable receipt of the cam follower system 70. Locking mechanisms 178, 180 and 182 are generally L-shaped members which extend from plate body 172 for coupling to seat locking mechanism 72.

Referring again to FIG. 6, the power seat apparatus is shown in a riding position, wherein moveable seat 24 is locked into a riding position 48. In this position, locking mechanism 178, 180 and 182 are locked beneath corresponding locking pads 86, 87 and 88 of seat locking mechanism 72 to secure the moveable seat 24 in a riding position. Further, in this position, in reference to lock mechanism 156, pin 160 is not extended from housing 158.

Referring to FIG. 9, the power seat apparatus 22 is operated to move moveable seat 24 from a riding position 48 to an intermediate position 49. Hydraulic power mechanism 62 is operated to extend the hydraulic cylinder rod 104 from housing 102. As rod 104 is extended from housing 102, trolley system 64 moves the parallel linkage system 66 along trolley rails 78, 80 away from seat locking mechanism 72 to the position shown. The exact movement and rotation of seat 24 will be described in detail later in the specification.

Referring to FIG. 10, upon reaching intermediate position 49, the latch mechanism 156 follower 162 drops from the first track portion 90, operating the latch mechanism 115 to extend pin 160 upward, indicated by arrow 186. The operation of pin 160 upward operates to engage the seat mounting plate 170, locking the moveable seat 24 in an outward extending position.

Referring to FIG. 11, the moveable seat 24 is shown in the fully extended position 50. The moveable seat 24 is moved from an intermediate position 49 to a fully extended position 50 by further operation of the power mechanism 62 to extend cylinder rod 104 from cylinder housing 102. As the rod 104 is extended from the cylinder housing 102, the trolley system 64 travels to the end of first track portion 90. During this travel, rollers 84, 85 are guided along the second track portion 92 until the parallel linkage system 66 is in a fully extended position indicated at 190.

In the fully extended position 190, the parallel linkage system 166 may operate to angle the seat mounting bracket 68 slightly from the vertical system, indicated by acute angle 192. The angled seat mounting bracket 68 results in the front 193 of the moveable seat 24 being tipped slightly downward to aid in allowing an individual to position themselves into the seat for movement into the vehicle. As previously described herein, this is a result of having a greater distance between where the upper arms 108, 110 and the lower arm 114 are coupled to mounting bracket 68, than where the upper arms 108, 110 and the lower arm 114 are mounted to the trolley system 64. Alternatively, it is recognized that the parallel linkage system 66 may be designed such that the moveable seat 24 remains relatively parallel to the vehicle floor or ground.

The power seat apparatus 22, in accordance with the present invention, allows the moveable seat 24 to be extended fully outside of the vehicle 28. Further, the moveable seat 24 may be extended below the vehicle floor, indicated at 194, and below the underside of the vehicle, indicated at 196, within inches of the ground as necessary.

Figure 12:
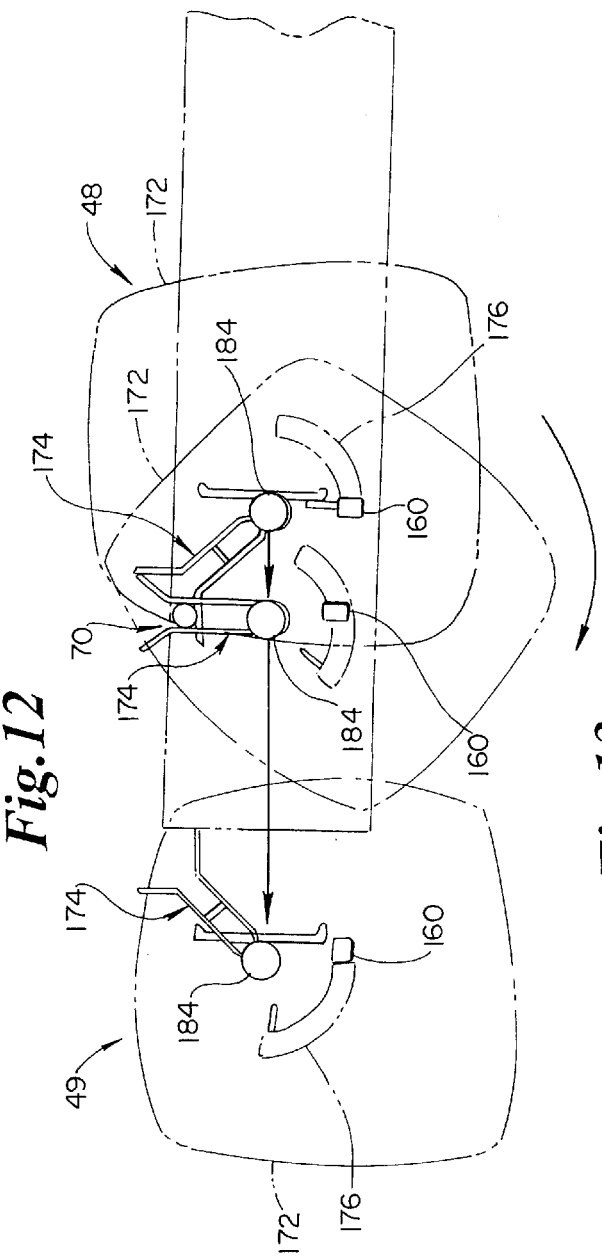
FIG. 12 is a top view showing the operation of the power seat apparatus cam follower system as the power seat apparatus rotates the seat as the seat is moved between a riding position and an extended position.

Referring to FIG. 12, the operation of the cam follower system 70 is generally shown. The cam follower system 70 allows the moveable seat 24 to be rotated from a first riding position 48 in which the seat is facing the front of the vehicle, to an extended position 50, in which the seat is facing out the side of the vehicle.

As the power mechanism 62 is operated to move the seat from the riding position 48 to the extended position 50, the cam follower bracket 174 is moved into the cam follower system 70. As the cam follower system 70 engages the cam follower bracket 174, the moveable seat 24 is rotated about the cam follower system 70 and seat shaft 184 as shown. The seat 24 is fully rotated outward upon reaching intermediate position 49. The relative positions of the cam follower system 70, the cam follower bracket 174, and the seat shaft 184 all affect the timed rotation of seat 24.

As the power mechanism 62 is further operated to extend the seat outward, the cam follower system 70 operates on the cam follower bracket 174 until the moveable seat 24 is in an outward extending position. Further, as the moveable seat 24 moves from a riding position 48 to the intermediate position 49, the latch mechanism 56 tracks along the latch mechanism track 176. When the moveable seat 24 reaches the intermediate position 49, as the parallel linkage 66, rollers 84 and 85 leave the first track portion 90, the latch mechanism 156 pin 160 extends upward to engage seat mounting plate 170 locking the moveable seat 24 in an outward facing position.

Within this specification, the movement of seat 24 has been described in moving from a riding position 48 through an intermediate position 49 to an extended position 50. The same system is merely operated in reverse to move the moveable seat 24 from an extended position 50 through an intermediate position 49 to return to the riding position 48. Upon returning to the riding position 48, the seat mounting plate 170 locking mechanisms 178–182 are again locked below the corresponding locking pads 86, 87 and 88.

Figure 13:
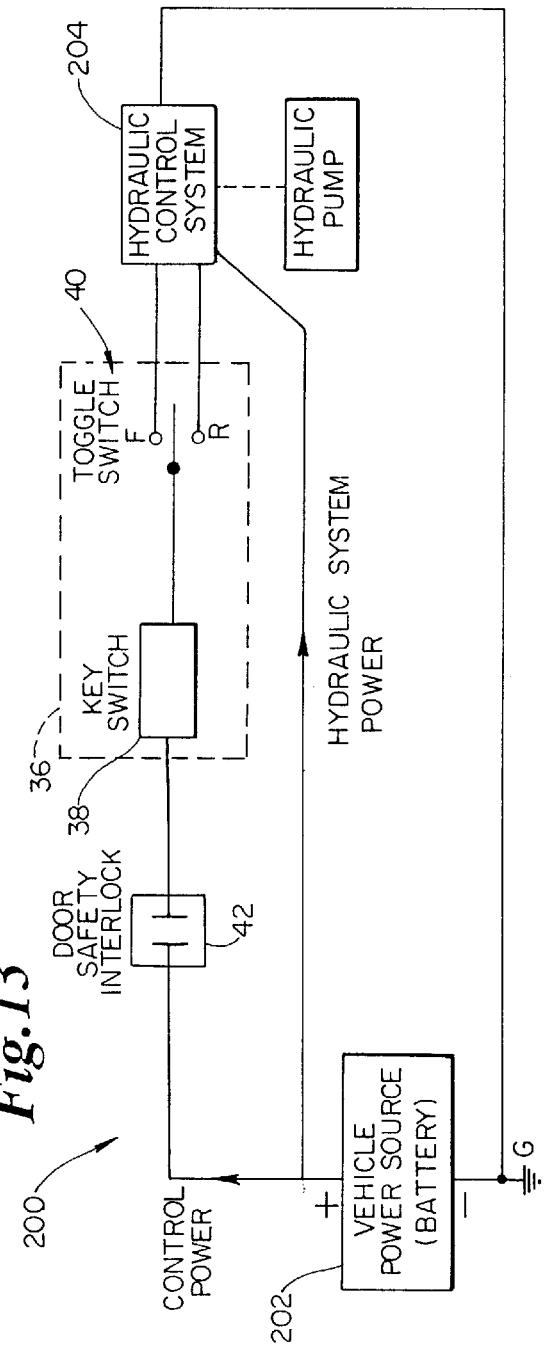
FIG. 13 is an electrical control schematic block diagram for control of the power seat apparatus.

Referring to FIG. 13, an electrical control system showing one embodiment of the present invention is generally shown at 200. The electrical control system 200 generally includes a control circuit 201 and a hydraulic system power circuit 203 extending from the vehicle power source 202 (battery). The hydraulic system power circuit 203 electrically couples the vehicle power source 202 to the hydraulic control system 204. The control circuit 201 generally includes a door safety interlock 42, the control mechanism 36 having key switch 38 and push button 40, and hydraulic control system 204. The door safety interlock 42 is coupled between the vehicle power source 202 and the control mechanism 36. The control mechanism 36 is coupled between the hydraulic control system 204 and ground G. The door 44 must be fully opened, and the key must be inserted within key switch 38 in order for the power seat apparatus to be operated.

It will be understood that this disclosure is, in many respects, only illustrative. Changes may be made in details, particularly in matters of shape, size, material, and arrangement of parts, without exceeding the scope of the invention. For example, it is recognized that the power seat mechanism in accordance with the present invention may be adapted for use within many different types of vehicles, such as cars, trucks, and vans, without exceeding the scope of the invention. Further, it is recognized that the present invention may be operated through a microprocessor based control system, or other control system capable of logic operations, or may further be integrated into the vehicle control system and dash control unit. Accordingly, the scope of the invention is as defined in the language of the appended claims.

What is claimed is:

1. An apparatus for use in moving a seat in a vehicle while maintaining vehicle seating capacity, the apparatus comprising:
    a frame coupled to the vehicle; and
    means coupled to the seat and frame for moving the seat between a forward facing position within the vehicle and an outward facing position outside the vehicle, having a single power mechanism for moving the seat in a first outward/inward direction and a second raise/lower direction.

2. The apparatus of claim 1, further wherein the single power mechanism rotates the seat in a third direction.

3. The apparatus of claim 1, where the single power mechanism is a hydraulic pump coupled to a single hydraulic cylinder.

4. The apparatus of claim 1, wherein the means for moving includes the single power mechanism coupled to a trolley system.

5. The apparatus of claim 4, wherein the frame further includes a trolley track.

6. The apparatus of claim 4, further comprising a parallel linkage system coupled to the trolley system.

7. The apparatus of claim 6, further comprising a seat bracket coupled to the parallel linkage system, wherein the seat bracket may be rotatably coupled to the seat.

8. The apparatus of claim 6, wherein the single power mechanism is coupled to the trolley system through the parallel linkage system.

9. The apparatus of claim 1, where in the means for moving the seat further comprises a cam follower system.

10. The apparatus of claim 9, wherein the cam follower system includes:

a cam follower coupled to the frame; and a cam follower bracket coupled to the seat.

11. The apparatus of claim 9, further comprising a second seat located adjacent the moveable seat.

12. The apparatus of claim 1, wherein the frame is generally straight.

13. The apparatus of claim 12, wherein the frame includes a first portion which is generally parallel to the floor and a second portion which is angled downward from the vehicle.

14. An apparatus form moving a seat for a vehicle, the apparatus comprising:

means for moving the seat between a first riding position and a second position outside of the vehicle;

means for timed rotation of the seat relative to the frame as the seat moves between the first riding position and the second position outside of the vehicle; and means for lowering/raising the seat as it is moved between the first riding position and the second position outside of the vehicle.

15. The apparatus of claim 14, further comprising means for locking the seat within the first riding position.

16. The apparatus of claim 14, further comprising means for locking the seat in a position outside the vehicle.

17. The apparatus of claim 14, wherein the means for moving the seat includes a trolley system coupled to a single hydraulic cylinder.

18. The apparatus of claim 14, wherein the means for timed rotation of the seat includes a cam follower system.

19. The apparatus of claim 17, wherein the means for lowering/raising the seat includes:

a parallel linkage system coupled between the seat and the trolley system; and a frame having a trolley track, the frame including a first portion located generally parallel to the vehicle floor and a second portion extending from the first portion which is angle downward as it exits the vehicle.

20. The apparatus of claim 14, wherein the seat is moved within inches of the ground outside the vehicle.

21. The apparatus of claim 14, wherein the seat is tipped downward when it is in the second position outside of the vehicle.

\* \* \* \* \*